United States Patent
Tomita et al.

(10) Patent No.: US 9,428,150 B2
(45) Date of Patent: Aug. 30, 2016

(54) PORTABLE DEVICE

(71) Applicants: Yosuke Tomita, Aichi (JP); Takahiro Inaguma, Aichi (JP)

(72) Inventors: Yosuke Tomita, Aichi (JP); Takahiro Inaguma, Aichi (JP)

(73) Assignee: OMRON AUTOMOTIVE ELECTRONICS CO., LTD., Aichi (JP)

( * ) Notice: Subject to any disclaimer, the term of this patent is extended or adjusted under 35 U.S.C. 154(b) by 0 days.

(21) Appl. No.: 14/633,337

(22) Filed: Feb. 27, 2015

(65) Prior Publication Data

US 2015/0246657 A1    Sep. 3, 2015

(30) Foreign Application Priority Data

Feb. 28, 2014  (JP) ................................ 2014-039011

(51) Int. Cl.
  *B60R 25/20* (2013.01)
  *B60R 25/00* (2013.01)
  *F02N 11/08* (2006.01)

(52) U.S. Cl.
  CPC ......... *B60R 25/2072* (2013.01); *B60R 25/209* (2013.01); *F02N 11/0807* (2013.01)

(58) Field of Classification Search
  CPC ............. B60R 25/2072; B60R 25/209; F02N 11/0807
  See application file for complete search history.

(56) References Cited

U.S. PATENT DOCUMENTS

| | | | |
|---|---|---|---|
| 7,061,368 B2 | 6/2006 | Okada | |
| 7,443,287 B2 | 10/2008 | Kawamura et al. | |
| 7,647,908 B1* | 1/2010 | Biondo | F02D 28/00 |
| | | | 123/179.2 |
| 7,760,108 B2* | 7/2010 | McCall | F02N 11/0807 |
| | | | 340/12.15 |
| 7,915,998 B2 | 3/2011 | Matsubara et al. | |
| 2008/0186131 A1* | 8/2008 | Hanai | B60R 25/2072 |
| | | | 340/5.2 |
| 2009/0243796 A1 | 10/2009 | Tieman | |
| 2012/0182122 A1 | 7/2012 | Nishiguchi | |

FOREIGN PATENT DOCUMENTS

| | | |
|---|---|---|
| DE | 10 2005 039 562 A1 | 3/2007 |
| EP | 2 251 837 A2 | 11/2010 |
| JP | 7-310632 | * 11/1995 |
| JP | 2003-191824 A | 7/2003 |
| JP | 2004-197649 A | 7/2004 |

(Continued)

OTHER PUBLICATIONS

Office Action in a counterpart German Patent Application No. 10 2015 203 347.3 issued Nov. 2, 2015 (10 pages).

*Primary Examiner* — Michael J Zanelli
(74) *Attorney, Agent, or Firm* — Osha Liang LLP (57) ABSTRACT

A portable device includes: a reception unit which receives state information of a vehicle from the vehicle; a transmission unit which transmits a signal to the vehicle; a control unit which controls communication with the vehicle; and a storage unit which stores at least two signal transmission intensities including a signal transmission intensity during engine stop and a signal transmission intensity during engine operation higher than the signal transmission intensity during engine stop, the signal transmission intensities being able to be set by the control unit. The control unit sets a signal transmission intensity of the signal transmitted from the transmission unit based on the state information received by the reception unit and the signal transmission intensities stored in the storage unit. The transmission unit transmits the signal based on the signal transmission intensity set by the control unit.

6 Claims, 7 Drawing Sheets

(56) References Cited

FOREIGN PATENT DOCUMENTS

| JP | 2006-089946 A | 4/2006 |
| JP | 2006-103355 A | 4/2006 |
| JP | 2007-191891 A | 8/2007 |
| JP | 2010-223052 A | 10/2010 |
| JP | 2010-265611 A | 11/2010 |
| JP | 2012-21331 | * 2/2012 |

* cited by examiner

FIG. 1A
TRANSMISSION OF SIGNAL DURING ENGINE STOP

WHILE ENGINE IS STOPPED, THERE IS NO ENGINE NOISE

FIG. 1B
TRANSMISSION OF SIGNAL DURING ENGINE OPERATION

WHILE ENGINE IS IN OPERATION, THERE IS ENGINE NOISE

FIG. 2A
WHILE ENGINE, etc. IS STOPPED, THERE IS NO NOISE

FIG. 2B
WHILE ENGINE, etc. IS IN OPERATION, THERE IS NOISE

FIG. 5A
TRANSMISSION OF ENGINE STARTING PERMISSION SIGNAL

FIG. 5B
TRANSMISSION OF ENGINE STOPPING SIGNAL

PORTABLE DEVICE

CROSS-REFERENCES TO RELATED APPLICATIONS

This application is based upon and claims the benefit of priority from Japanese Patent Application No. 2014-039011, filed on Feb. 28, 2014; the entire contents of which are incorporated herein by reference.

FIELD

One or more embodiments of the present invention relate to a portable device that performs radio communication with a vehicle.

BACKGROUND

In the related art, various countermeasures have been taken for noise in radio communication between a vehicle and a portable device (FOB) for operating the vehicle. For example, Japanese Unexamined Patent Application Publication No. 2004-197649 discloses an engine control system that can guarantee communication with high reliability in which deterioration due to noise is prevented. In the engine control system, interactive communication is performed between a portable device on a user side and a transceiver on a vehicle side, a motor having a high-voltage battery as a power source is provided, and the operation of a switching noise source connected to the battery is limited when communication is performed between the portable device and the transceiver.

Japanese Unexamined Patent Application Publication No. 2007-191891 discloses a remote control system for an onboard device that can improve reliability of radio communication with a portable device without deteriorating convenience. The remote control system for an onboard device includes an onboard device and a portable device, and the portable device includes a received magnetic field intensity detecting unit that detects a reception state from the onboard device and returns RSSI information which is information indicating the reception state detected by the received magnetic field intensity detecting unit when receiving a call signal transmitted from the onboard device. The onboard device displays the received RSSI information with an alarm unit and allows a user to check that the system can normally operate even at the time of activation of the onboard device in which electromagnetic noise of the vehicle interfering with the radio communication with the portable device increases.

Japanese Unexamined Patent Application Publication No. 2003-191824 discloses a remote control system for an onboard device that can guarantee a stable communication area before starting a vehicle power source and suppress an occurrence of a communication error due to driving thereof after starting the vehicle power source in regard to communication between the onboard device and a portable device. The remote control system for an onboard device is provided with an onboard device that can transmit request signals having different frequencies and a portable device that can receive the request signals having different frequencies, which have been transmitted from the onboard device. When engine starting control is performed before starting an engine, downlink communication from the onboard device to the portable device is performed using radio waves of a low frequency of 134 kHz. On the other hand, when a process of checking whether the portable device is present in the vehicle interior is performed after starting the engine, the downlink communication from the onboard device to the portable device is performed using radio waves of a high frequency of 300 MHz.

Japanese Unexamined Patent Application Publication No. 2006-103355 discloses a smart keyless control system that can avoid an influence of electromagnetic noise from onboard electrical devices and rapidly restart an engine. The smart keyless control system determines whether an engine starting operation is performed within a predetermined amount of time from the previous engine stop when the engine starting operation satisfies a predetermined condition. The engine start is permitted through in-vehicle authentication when the engine starting operation is performed within the predetermined amount of time from the previous engine stop, and the engine start is permitted without the authentication when the engine starting operation is performed after the predetermined amount of time elapses from the previous engine stop. When the engine start is permitted without the authentication, a response request signal is transmitted with a high transmission intensity for the authentication after the predetermined amount of time elapses.

Japanese Unexamined Patent Application Publication No. 2010-223052 discloses an onboard device that can satisfactorily transmit a control result of a vehicle to a portable device with low power consumption. The onboard device detects an intensity of a signal when the signal is received from the portable device, and returns a signal indicating a vehicle control process of controlling the vehicle and a control result thereof to the portable device with an intensity corresponding to the detected intensity of the signal in response to the received signal.

Japanese Unexamined Patent Application Publication No. 2006-089946 discloses a portable device that can easily and satisfactorily control a communication-enabled area with a controller. The portable device performs interactive radio communication with an onboard device for controlling a door lock driving device or an engine starting device of a vehicle and remotely controls the onboard device on the basis of the communication. The portable device receives a request signal transmitted from the onboard device and decreases or increases the reception sensitivity thereof by a predetermined sensitivity level to adjust the reception sensitivity.

Japanese Unexamined Patent Application Publication No. 2010-265611 discloses a remote control system that can simply set a communication area corresponding to a remote control target. The remote control system wirelessly transmits information on the response sensitivity of a portable device suitable for a vehicle (vehicle type or the like) when a registration request signal for requesting for performing a portable device registering process is input from the outside. When information on the response sensitivity wirelessly transmitted from the vehicle side is received, the portable device sets its response sensitivity on the basis of the information and wirelessly transmits its specific identification information to the vehicle side.

SUMMARY

When radio communication is performed between a vehicle and a portable device, noise is generated due to operation of an engine or the like, and thus a communication-enabled distance varies in a state in which the engine of the vehicle or the like is in operation and in a state in which the engine is stopped. For example, in a system (for example, a system having a remote engine starting function)

for remotely starting an engine or the like, noise when the engine is turned off to switch the engine from the operation state to the stopped state is stronger than that when the engine is turned on to switch the engine from the stopped state to the operation state by the remote operation from the portable device. Then, when signals of the same transmission intensity are used in the engine turning-on operation and the engine turning-off operation and the operations are performed at the same position by a user, a situation in which the turning-on operation is possible but the turning-off operation is not possible occurs. Particularly, when the operations are performed by the user at a remote position at which the user cannot see the vehicle with eyes or cannot hear engine sounds of the vehicle, this situation occurs. Since the user thinks that the turning-off operation can be performed at a position at which the turning-on operation can be performed, the operation state of the engine is maintained in spite of the user's operation of turning off the engine and the user cannot recognize this situation.

One or more embodiments of the invention provide a portable device that can guarantee reliability of communication depending on a vehicle state and suppress power consumption of the portable device in radio communication with a vehicle, which is performed by the portable device.

According to one or more embodiments of the invention, there is provided a portable device including: a reception unit which receives state information of a vehicle from the vehicle; a transmission unit which transmits a signal to the vehicle; a control unit which controls communication with the vehicle; and a storage unit which stores at least two signal transmission intensities including a signal transmission intensity during engine stop and a signal transmission intensity during engine operation higher than the signal transmission intensity during engine stop, the signal transmission intensities being able to be set by the control unit, in which the control unit sets a signal transmission intensity of the signal transmitted from the transmission unit based on the state information received by the reception unit and the signal transmission intensities stored in the storage unit, and the transmission unit transmits the signal based on the set signal transmission intensity.

According to this configuration, it is possible to guarantee reliability of communication by transmitting a signal with the transmission intensity corresponding to the state of the vehicle. Accordingly, it is possible to prevent the operated state of the engine from being maintained, for example, even when a user turns off the engine. Since it is not necessary to always transmit a signal with a high intensity, it is possible to suppress power consumption of the portable device.

The portable device may further include at least one switch, and the control unit may control the transmission unit so as to transmit the signal in response to detection of an operation of the switch.

According to this configuration, it is possible to transmit signals depending on a user's intention.

The at least one switch may include an engine start switch for transmitting an engine starting permission signal and an engine stop switch for transmitting the engine stopping signal.

According to this configuration, a user can easily perform the engine starting operation and the engine stopping operation.

The reception unit may receive an engine starting success signal indicating that starting of an engine has succeeded in response to the engine starting permission signal and an engine stopping success signal indicting that stopping of the engine has succeeded in response to the engine stopping signal.

According to this configuration, a user can check whether the engine starting operation and the engine stopping operation of the portable device have succeeded.

The control unit may set the signal transmission intensity to a highest signal transmission intensity of at least two signal transmission intensities during engine operation when the reception unit does not receive the engine starting success signal within a predetermined amount of time after the transmission unit transmits the engine starting permission signal or when the reception unit does not receive the engine stopping success signal within a predetermined amount of time after the transmission unit transmits the engine stopping signal.

According to this configuration, it is possible to guarantee higher reliability of communication by setting the signal transmission intensity to be higher when it is not clear whether the engine starting operation and the engine stopping operation have succeeded.

According to one or more embodiments of the invention, there is provided a portable device including: a reception unit which receives state information of a vehicle from the vehicle; a transmission unit which transmits a signal to the vehicle; a control unit which controls communication with the vehicle; and a storage unit which stores at least two signal transmission intensities comprising a signal transmission intensity during vehicle stop and a signal transmission intensity during vehicle operation higher than the signal transmission intensity during vehicle stop, the signal transmission intensities being able to be set by the control unit, in which the control unit sets a signal transmission intensity of the signal transmitted from the transmission unit based on the state information received by the reception unit and the signal transmission intensities stored in the storage unit, and the transmission unit transmits the signal based on the signal transmission intensity set by the control unit.

According to this configuration, it is possible to guarantee reliability of communication by transmitting the signal with a transmission intensity corresponding to a state of an electric automobile or the like from the portable device and to prevent the power-on state of the electric automobile from being maintained, for example, even when a user performs a power-off operation of the electric automobile or the like. Since it is not necessary to always transmit a signal with a high intensity, it is possible to suppress power consumption of the portable device.

As described above, according to one or more embodiments of the invention, it is possible to provide a portable device that can guarantee reliability of communication depending on a vehicle state and suppress power consumption of the portable device in radio communication with a vehicle, which is performed by the portable device.

BRIEF DESCRIPTION OF THE DRAWINGS

FIGS. 1A and 1B are diagrams illustrating communication between a portable device according to a first embodiment of the invention and a vehicle, where FIG. 1A illustrates a case in which a signal during engine stop is transmitted and FIG. 1B illustrates a case in which a signal during engine operation is transmitted;

FIGS. 2A and 2B are diagrams illustrating a transmission signal level of the portable device according to the first embodiment of the invention, where FIG. 2A illustrates a case in which an engine or the like is not in operation and there is no noise and FIG. 2B illustrates a case in which the engine or the like is operation and there is noise;

FIGS. 4A and 4B are flowcharts illustrating control steps of the portable device according to the first embodiment of the invention, where FIG. 4A illustrates a signal receiving process in the portable device and FIG. 4B illustrates a signal transmitting process in the portable device;

FIGS. 5A and 5B are diagrams illustrating communication between a portable device according to a second embodiment of the invention and a vehicle, where FIG. 5A illustrates an engine starting permission signal and FIG. 5B illustrates an engine stopping signal;

FIGS. 9A and 9B are flowcharts illustrating control steps of an ECU according to the second embodiment of the invention, where FIG. 9A illustrates an engine starting permission signal receiving process in the ECU and FIG. 9B illustrates an engine stopping signal receiving process in the ECU.

DETAILED DESCRIPTION

Hereinafter, exemplary embodiments of the invention will be described with reference to the accompanying drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

First Embodiment

A first embodiment of the invention will be described below with reference to FIGS. 1A to 4B. Communication between a portable device 10 according to this embodiment and a vehicle 1 will be described below with reference to FIGS. 1A and 1B and FIGS. 2A and 2B. When radio communication is performed between the vehicle 1 and the portable device 10, electromagnetic waves of various frequencies generated from an engine in operation in the vehicle 1 may serve as noise for electromagnetic waves of the radio communication and may adversely affect the radio communication. Then, in a state in which the engine of the vehicle 1 is in operation and a state in which the engine is stopped, a communication-enabled distance or communication quality of the radio communication may greatly vary. The communication-enabled distance or the communication quality may vary depending on whether an air conditioner, a car navigation device, and the like of the vehicle 1 are in operation as well as the engine. Accordingly, in the embodiment of the invention, the transmission intensity with which a radio signal is transmitted is changed depending on a state of a vehicle, that is, environments in which noise based on the vehicle state is great or small.

For example, it is assumed that the vehicle 1 is provided with a remote engine start system. When the engine of the vehicle 1 is turned on by the remote operation from the portable device 10 to switch the engine from the stopped state to the operation state, the engine of the vehicle 1 is not in operation yet and thus no noise is generated from the vehicle 1. On the other hand, when the engine of the vehicle 1 is turned off by the remote operation from the portable device 10 to switch the engine from the operation state to the stopped state, the engine, an air conditioner, or the like is in operation and thus a lot of noise is generated from the vehicle 1.

The portable device 10 acquires state information of the vehicle 1 using any method. For example, in a passive entry system, the state information may be transmitted at the same time as transmitting a response request signal from the vehicle to the portable device and the portable device may receive the response request signal and the state information of the vehicle. The state information may be additionally received when a signal is received from the vehicle by a portable device carrying-out monitoring function or the like in the passive entry system.

Figure 1A:
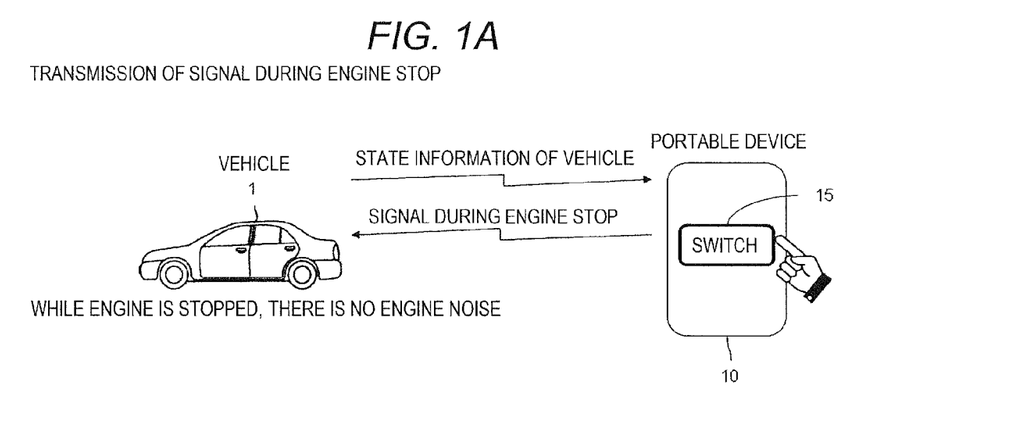
Figure 1B:
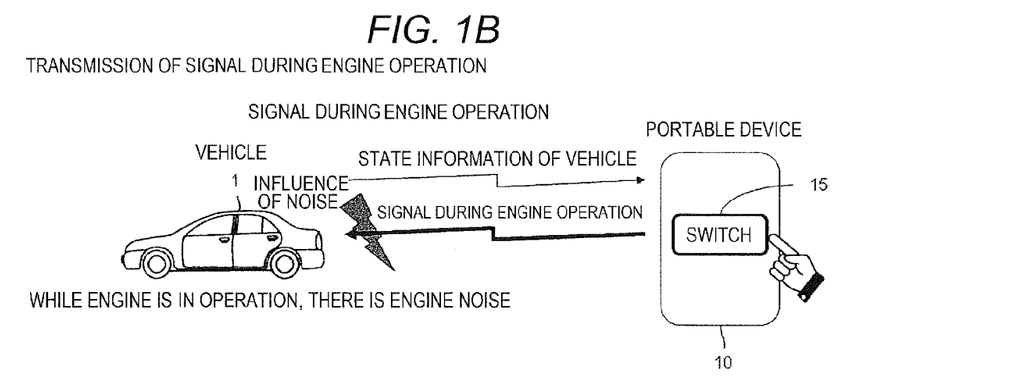

As illustrated in FIG. 1A, when a user operates a switch 15 of the portable device 10 for the vehicle 1 of which the engine is stopped, the portable device 10 transmits a signal in an environment in which there is no noise and thus transmits the signal with a signal transmission intensity during engine stop which is a relatively low intensity. On the other hand, as illustrated in FIG. 1B, when the user operates the switch 15 of the portable device 10 for the vehicle 1 in which the engine is in operation, the portable device 10 transmits a signal in an environment in which there is noise and transmits the signal with a signal transmission intensity during engine operation which is a relatively high intensity. As a result, the signal transmitted from the portable device 10 can be received by the vehicle side in spite of the influence of noise emitted from the vehicle 1 and thus it is possible to guarantee reliability of communication by realizing the transmission intensity corresponding to the vehicle state. The signal transmitted while the engine is stopped is not limited to an engine starting permission signal for starting the engine of the vehicle 1, but may be another signal (for example, a signal locking or unlocking a door or a signal turning on or off an air conditioner). The signal transmitted while the engine is in operation is not limited to an engine stopping signal for stopping the engine of the vehicle 1, but may be another signal (for example, a signal locking or unlocking a door or a signal turning on or off an air conditioner).

Figure 2A:
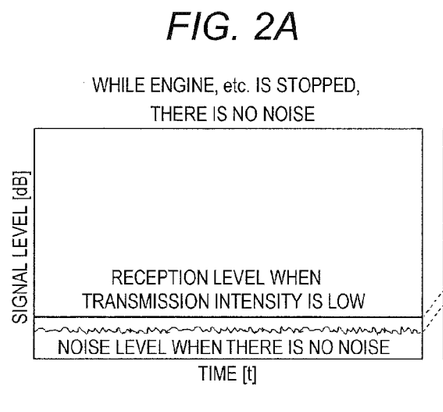

For the purpose of simplification, it has been described above that there is no noise while the engine is stopped, but slight noise (floor noise) is present in an actual environment even when the engine is stopped as illustrated in FIG. 2A. In order to allow the vehicle side to satisfactorily receive a signal from the portable device 10, the SN ratio is preferably made great enough, but the power consumption of the portable device 10 also increases. Accordingly, when the noise level is low, that is, when the engine is stopped, the portable device 10 sets the transmission intensity to a minimum SN ratio necessary for reception and transmits the signal with the set transmission intensity.

Figure 2B:
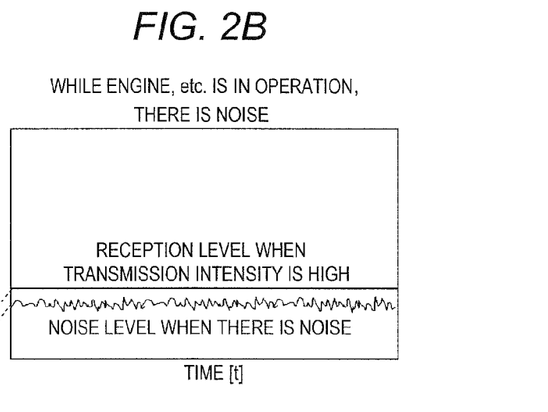

As illustrated in FIG. 2B, when the engine or the like is in operation and thus noise increases, the transmission intensity when noise is small is lower than the noise level when noise is large, and thus the signal is buried in the noise.

Accordingly, the portable device sets the transmission intensity to a minimum SN ratio necessary for reception and transmits the signal even when noise is generated from the vehicle. As a result, for example, even when a user operates the portable device at a remote position at which the user cannot see the vehicle with eyes or cannot hear engine sound of the vehicle, the engine turning-off operation can be performed at the position at which the engine turning-on operation could be performed, and it is thus possible to guarantee the reliability of communication by realizing the transmission intensity corresponding to the state of the vehicle and to suppress the power consumption of the portable device 10.

Figure 3:
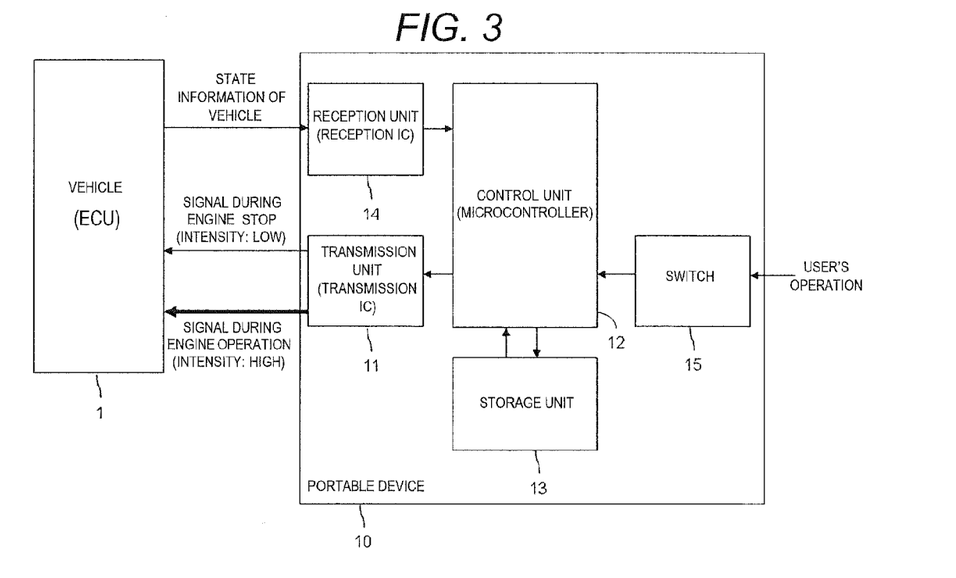
FIG. 3 is a block diagram illustrating the portable device according to the first embodiment of the invention.

The portable device 10 will be described below with reference to FIG. 3. The portable device 10 includes a reception unit 14 that receives the state information of the vehicle 1 from the vehicle 1, a transmission unit 11 that transmits a signal to the vehicle 1, a control unit 12 that controls the communication with the vehicle 1, a storage unit 13 that stores the transmission intensity of the signal transmitted from the transmission unit 11, and a switch 15 that receives a user's operation. Here, more specifically, the vehicle 1 is an onboard electronic control unit (ECU) having an antenna capable of receiving a signal from the portable device 10 and an antenna capable of transmitting a signal to the portable device 10.

Since a signal is generally transmitted from the antenna of the ECU using radio waves of a low-frequency (LF) band, the reception unit 14 is constituted by a reception integrated circuit (IC) capable of receiving the radio waves. The reception unit 14 receives the state information of the vehicle 1. The state information of the vehicle 1 means information of whether the engine of the vehicle 1 is stopped or in operation as described above and information on devices such as an air conditioner, a car navigation device, and a wiper which affects a noise environment depending on whether the devices mounted on the vehicle 1 are stopped or in operation. The ECU acquires the state of the vehicle 1 and transmits the state information voluntarily or in a state in which the state information is included in a response signal to a request signal from the portable device 10.

The control unit 12 is constituted by a microcontroller which controls the communication with the vehicle 1 using the reception unit 14 and the transmission unit 11 and controls the transmission process of the transmission unit 11 on the basis of reading and writing of data from and to the storage unit 13 and an input from a user through the switch 15. The control unit 12 sets the transmission intensity of a signal to be transmitted from the transmission unit 11 on the basis of the state information of the vehicle 1 received by the reception unit 14 and the signal transmission intensities stored in the storage unit 13.

The control unit 12 transmits a signal in an environment in which the noise level is low when the state information of the vehicle 1 indicates that the engine is stopped and thus sets the transmission intensity to be relatively low. On the other hand, the control unit 12 transmits a signal in an environment in which the noise level is high when the state information of the vehicle 1 indicates that the engine is in operation and thus sets the transmission intensity to be relatively high. That is, the control unit 12 sets the transmission intensity depending on the vehicle state in which the engine is stopped or in operation. Specifically, the control unit 12 sets the transmission intensity of a signal (for example, an engine starting permission signal) to be transmitted while the engine is stopped so as to be lower than the transmission intensity of a signal (for example, an engine stopping signal) to be transmitted while the engine is in operation. In other words, the control unit 12 sets the signal transmission intensity during engine operation to be higher than the signal transmission intensity during engine stop.

The storage unit 13 stores a signal transmission intensity during engine stop and a signal transmission intensity during engine operation which is higher, which can be set by the control unit 12 and in which the signals are transmitted by the transmission unit 11. The storage unit 13 may store other transmission intensities. For example, when the transmission intensity is changed depending on whether an air conditioner is in operation and when the engine is in operation and the air conditioner is in operation, the control unit 12 may set the transmission intensity to be higher than the transmission intensity of the engine stopping signal. In this case, the storage unit 13 stores three transmission intensities of the transmission intensity of the engine starting permission signal, the transmission intensity of the engine stopping signal, and the transmission intensity of the signal while the engine and the air conditioner are in operation.

The storage unit 13 is generally constituted by a nonvolatile memory such as a read only memory (ROM) in order not to lose data even when the battery is completely discharged, but the invention is not particularly limited to this configuration. The switch 15 is a switch such as a push button and is not particularly limited in the type or the number thereof as long as it can receive a user's operation. For example, as illustrated in FIGS. 1A and 1B, the switch may be a single button which is commonly used for plural functions, may include two push buttons, or may include two or more push buttons.

The transmission unit 11 is configured to transmit the engine starting permission signal and the engine stopping signal to the vehicle 1 on the basis of the signal transmission intensity set by the control unit 12. The engine starting permission signal and the engine stopping signal which are transmitted from the transmission unit 11 serve to start the engine of the vehicle 1 into an operation state and to stop the engine of in operation the vehicle 1, respectively, when the signals are received by the ECU of the remote vehicle 1. The transmission unit 11 may be configured to transmit another signal for locking or unlocking the door of the vehicle 1.

Figure 10:
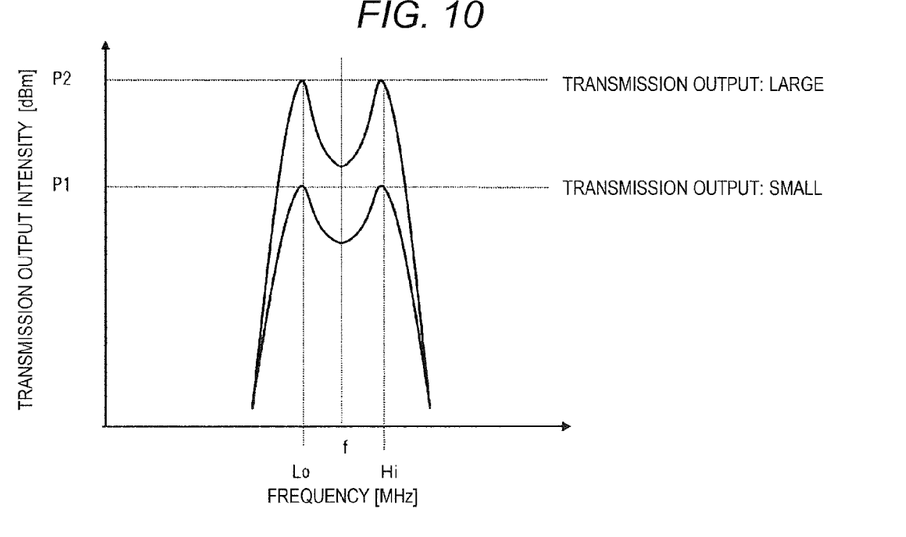
FIG. 10 is a diagram illustrating transmission output intensities by frequency of the portable device according to the first embodiment of the invention.

The signal transmitted from the portable device 10 is normally sent out using radio waves of an ultra high frequency (UHF) band, but is not limited to this frequency band. The radio waves sent out from the portable device 10 carry data using a method (frequency shift keying (FSK)) of changing carriers to low frequencies when the frequency is at the Lo level about a certain frequency f and changing carriers to high frequencies when the frequency is at the Hi level about the frequency f as illustrated in FIG. 10, but the invention is not particularly limited to this method. In the drawing, the curve in which the maximum transmission output intensity is P1 represents the relationship between the frequency and the transmission output intensity when the signal during engine stop is transmitted, and the curve in which the maximum transmission output intensity is P2 represents the relationship between the frequency and the transmission output intensity when the signal during engine operation is transmitted.

The transmission unit 11 is constituted by a transmission integrated circuit (IC) and transmits a signal to the vehicle 1 with the transmission intensity set by the control unit 12 on the basis of the state information of the vehicle 1 received by the reception unit 14 and the signal transmission intensities stored in the storage unit 13. More specifically, the transmission unit 11 transmits the signal during engine operation with a transmission intensity higher than that of the signal during engine stop. As illustrated in FIG. 10, the transmission unit 11 outputs the small transmission output intensity P1 at the time of transmitting the signal during engine stop, and outputs the large transmission output intensity P2 at the time transmitting the signal during engine operation. These transmission output intensities are transmitted at appropriate SN ratios depending on the noise environments thereof as described above.

According to this configuration, it is possible to guarantee the reliability of communication by transmitting a signal from the portable device 10 with the transmission intensity corresponding to the state of the vehicle 1 and to prevent the operation state of the engine from being maintained, for example, even when the user performs the engine turning-off operation. Since it is not necessary to always transmit a signal with a high intensity, it is possible to suppress the power consumption of the portable device 10.

The control unit 12 may control the transmission unit 11 so as to transmit the engine starting permission signal and the engine stopping signal when the user's operation of the switch 15 is detected. According to this configuration, it is possible to transmit both signals depending on the user's intention. The switch which is operated by the user may include two switches of a switch for transmitting the engine starting permission signal and a switch for transmitting the engine stopping signal. According to this configuration, the user can easily perform an engine starting operation and an engine stopping operation.

Figure 4A:
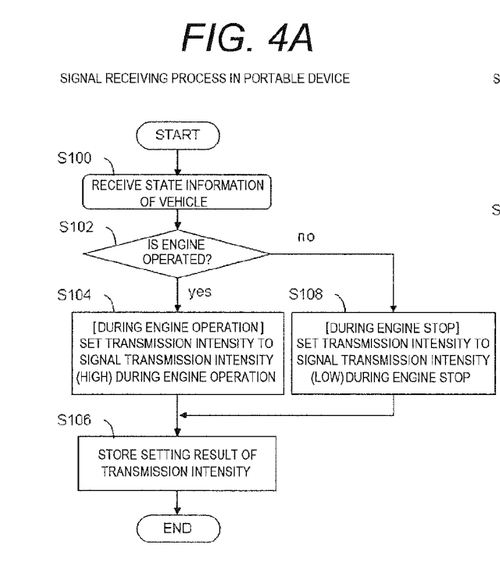
Figure 4B:
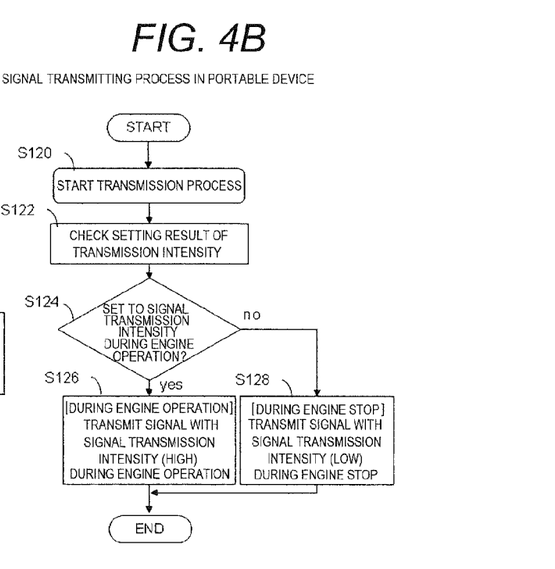

Process in the portable device 10 when a signal on the state information of the vehicle 1 is received and when the signal is transmitted will be described with reference to FIGS. 4A and 4B. In the flowcharts, S means a step.

The reception unit 14 of the portable device 10 receives information on the operation state of the engine of the vehicle 1 in S100. When the reception unit 14 receives the vehicle state information, the control unit 12 checks whether the engine is in operation on the basis of the received state information in S102. When the engine is in operation, the control unit 12 sets the transmission intensity to a high transmission intensity in S104. On the other hand, when the engine is not in operation, the control unit 12 sets the transmission intensity to a low transmission intensity in S108. The control unit 12 writes the setting result of the transmission intensity corresponding to the engine state of the vehicle 1 to the storage unit 13 as described above in S106 and the storage unit 13 stores the setting result. As the vehicle state information, the operation state of the engine is taken as an example, but the same is true of the operation state of the air conditioner.

At the time of transmitting a signal from the portable device 10, the control unit 12 first starts the transmission process in S120. Then, the control unit 12 reads and checks the setting result of the transmission intensity stored in the storage unit 13 in S122. In S124, the control unit 12 checks whether the transmission intensity read from the storage unit 13 is the high signal transmission intensity during engine operation. When the transmission intensity read from the storage unit 13 is the signal transmission intensity during engine operation which is a high transmission intensity, the control unit 12 controls the transmission unit 11 so as to transmit a signal with the signal transmission intensity during engine operation in S126 and the transmission unit 11 transmits the signal with the signal transmission intensity during engine operation. On the other hand, when the transmission intensity read from the storage unit 13 is the signal transmission intensity during engine stop which is a low transmission intensity, the control unit 12 controls the transmission unit 11 so as to transmit a signal with the signal transmission intensity during engine stop in S128 and the transmission unit 11 transmits the signal with the signal transmission intensity during engine stop.

As described above, the control unit 12 stores the signal transmission intensity during engine stop and the signal transmission intensity during engine operation, which is higher than the signal transmission intensity during engine stop, in the storage unit 13 depending on the operation state of the engine of the vehicle 1, and the transmission unit 11 transmits a signal on the basis of the transmission intensity stored in the storage unit 13. According to this configuration, it is possible to guarantee the reliability of communication by transmitting a signal from the portable device 10 with the transmission intensity corresponding to the state of the vehicle 1 and to prevent the operation state of the engine from being maintained, for example, even when the user performs the engine turning-off operation. Since it is not necessary to always transmit a signal with a high intensity, it is possible to suppress the power consumption of the portable device.

In this embodiment, the storage unit 13 stores the transmission intensity itself, but may store a vehicle state instead of the transmission intensity. For example, the storage unit 13 may store a state in which the engine is stopped instead of the signal transmission intensity during engine stop. The storage unit 13 may store a state in which the engine is in operation instead of the signal transmission intensity during engine operation. In this case, when the control unit 12 reads the vehicle state in which the engine is stopped from the storage unit 13, the transmission unit 11 sets the transmission intensity to a relatively low transmission intensity to transmit the engine starting permission signal. When the vehicle state in which the engine is in operation is read, the transmission unit 11 sets the transmission intensity to a relatively-high transmission intensity to transmit the engine stopping signal.

Second Embodiment

A second embodiment of the invention will be described below with reference to FIGS. 5A to 9B. Differences from the first embodiment will be mainly described in order to avoid repeated description.

Figure 6:
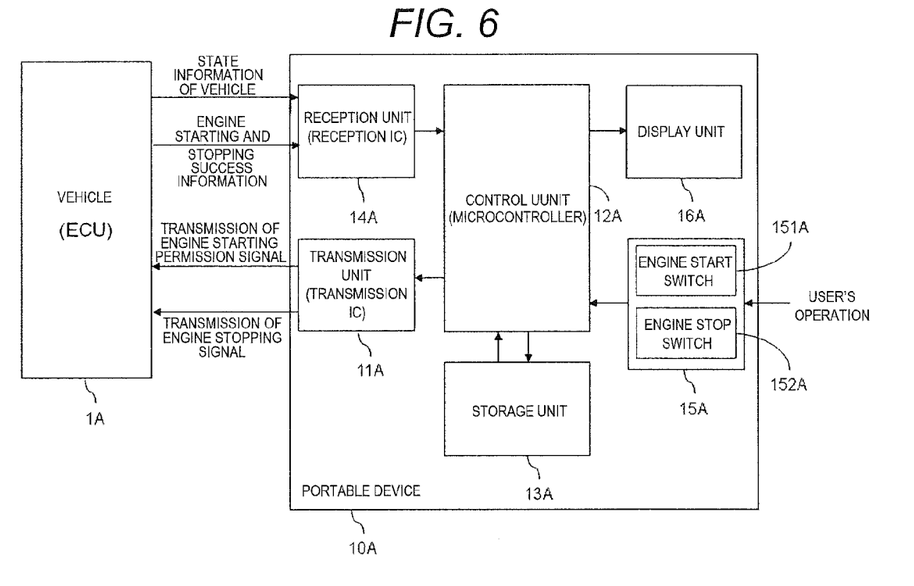
FIG. 6 is a block diagram illustrating the portable device according to the second embodiment of the invention.

FIG. 6 is a block diagram illustrating a portable device 10A. Unlike in the first embodiment, the portable device 10A includes plural switches of an engine start switch 151A and an engine stop switch 152A. According to this configuration, a user can easily perform an engine starting operation and an engine stopping operation. A reception unit 14A receives the state information of a vehicle 1A and receives information of whether the engine starting actually has succeeded or the engine stopping actually has succeeded. The portable device 10A further includes a display unit 16A. The display unit 16A displays a success or fail response to the operation, such as whether the engine starting actually has succeeded or the engine stopping actually has succeeded, for the user having performed the operation.

Figure 5A:
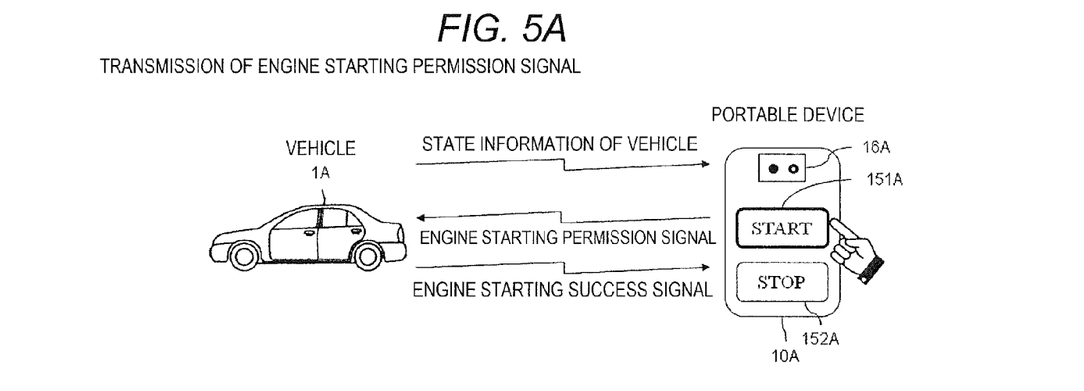

Communication between the portable device 10A and the vehicle 1A will be described below with reference to FIGS. 5A and 5B. The portable device 10A acquires the state information of the vehicle 1A received as a response signal from the vehicle 1A when the user previously performed a remote operation. That is, when the user previously performed the engine starting operation and a response signal indicating that the engine starting has succeeded is received, the portable device 10A acquires information indicating that the engine of the vehicle 1A is in an operation state. When the user previously performed the engine stopping operation and a response signal indicating that the engine stopping has succeeded is received, the portable device 10A acquires information indicating that the engine of the vehicle 1A is in a stopped state. As illustrated in FIG. 5A, when the user operates the engine start switch 151A of the portable device 10A for the vehicle 1A, the portable device 10A transmits an engine starting permission signal for starting the engine of the vehicle 1A. At this time, the portable device 10A transmits the engine starting permission signal with a relatively-low transmission intensity in an environment in which there is no noise.

When the engine starting permission signal is received from the portable device 10A, the vehicle 1A starts the engine in response to the received signal. When the engine is actually started, the vehicle 1A transmits an engine starting success signal indicating that the engine starting has succeeded to the portable device 10A. When the engine starting success signal is received, the portable device 10A displays an indicator indicating that the engine starting has succeeded through the use of the display unit 16A so as to allow the user to recognize the fact (in the drawing, the left lamp is turned on). When the engine is not actually started for a certain reason, the vehicle 1A does not transmit the engine starting success signal and/or transmits a signal indicating that the engine starting has failed.

Figure 5B:
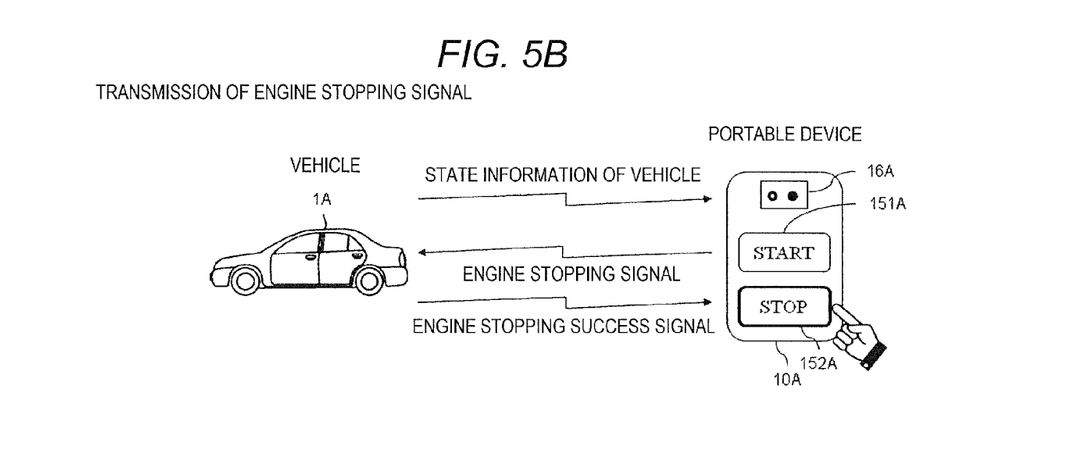

On the other hand, as illustrated in FIG. 5B, when the user operates the engine stop switch 152A of the portable device 10A for the vehicle 1A, the portable device 10A transmits an engine stopping signal for stopping the engine of the vehicle 1A. At this time, the portable device 10A transmits the engine stopping signal with a relatively-high transmission intensity in an environment in which the noise level is high. When the engine stopping signal is received from the portable device 10A, the vehicle 1A stops the engine in response to the received signal. When the engine is actually stopped, the vehicle 1A transmits an engine stopping success signal indicating that the engine stopping has succeeded to the portable device 10A. When the engine stopping success signal is received, the portable device 10A displays an indicator indicating that the engine stopping has succeeded on the display unit 16A so as to allow the user to recognize the fact (in the drawing, the right lamp is turned on). When the engine is not actually stopped for a certain reason, the vehicle 1A does not transmit the engine stopping success signal and/or transmits a signal indicating that the engine stopping has failed.

As described above, when an operation signal is transmitted from the portable device 10A to the vehicle 1A, the user can check whether the engine starting operation and the engine stopping operation in the portable device 10A succeed by transmitting the operation signal with a transmission intensity corresponding to the state of the vehicle 1A and receiving a response signal indicating success or fail in response to the operation signal from the vehicle 1A. Accordingly, it is possible to guarantee the higher reliability of communication between the vehicle and the portable device.

Figure 7:
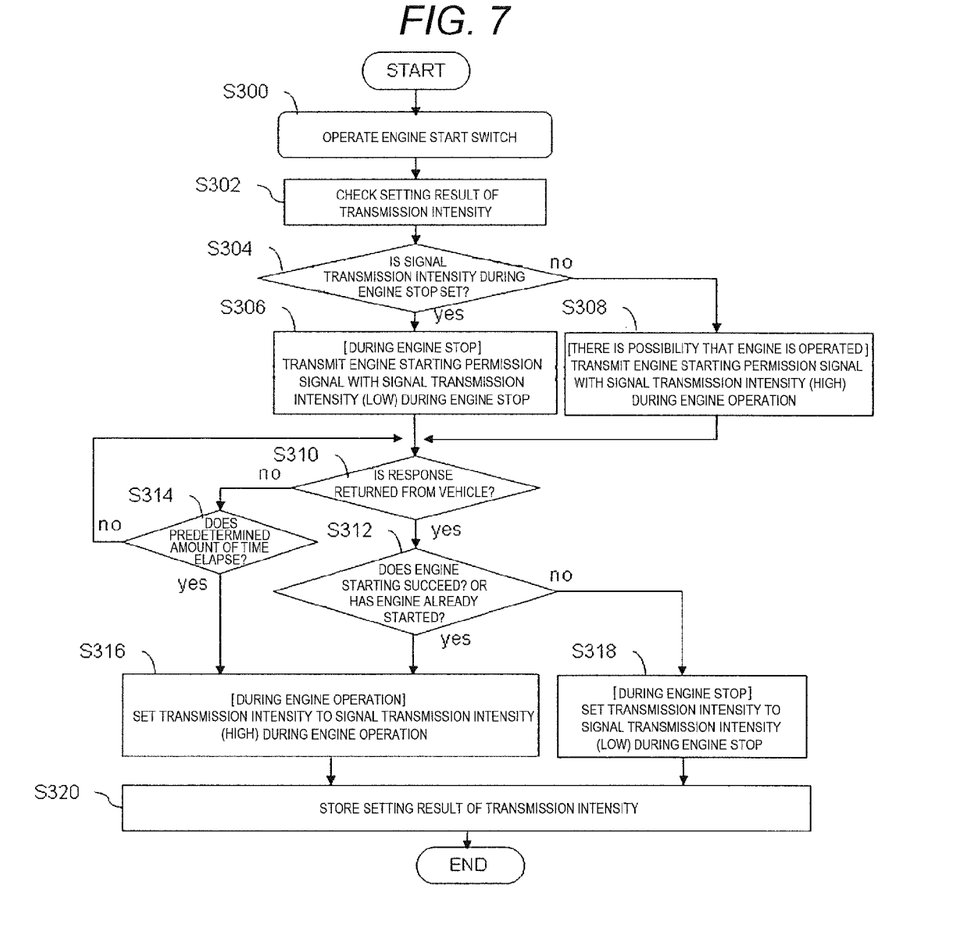
FIG. 7 is a flowchart illustrating control steps when an engine start switch is operated in the portable device according to the second embodiment of the invention.

FIG. 7 illustrates control steps in the portable device 10A when the engine start switch 151A is operated. In S300, the portable device 10A detects that the engine start switch 151A is operated by the user. Thereafter, in S302, the control unit 12A reads and checks the setting result of the transmission intensity stored in the storage unit 13A in order to transmit the engine starting permission signal for starting the engine. In S304, the control unit 12A checks whether the transmission intensity read from the storage unit 13A is the signal transmission intensity during engine stop which is a low transmission intensity. When the transmission intensity read from the storage unit 13A is the signal transmission intensity during engine stop, the control unit 12A controls the transmission unit 11A so as to transmit a signal with the low transmission intensity and the transmission unit 11A transmits the engine starting permission signal with the low transmission intensity in S306.

On the other hand, when the transmission intensity read from the storage unit 13A is not the signal transmission intensity during engine stop which is a low transmission intensity, the control unit 12A controls the transmission unit 11A so as to transmit a signal with the high transmission intensity in S308 because there is a possibility that the engine is actually in operation, and the transmission unit 11A transmits the engine starting permission signal with the high transmission intensity.

In S310, the control unit 12A checks whether a response signal from the vehicle 1A is returned within a predetermined amount of time (S314) (for example, about 15 seconds) after the user transmits the engine starting permission signal or the engine stopping signal to the vehicle 1A. When the response signal is received from the vehicle 1A within the predetermined amount of time, the control unit 12A checks whether the received response signal is a signal indicating that the engine starting has succeeded or a signal indicating that the engine has been already started in S312. When the received response signal is a signal indicating that the engine starting has succeeded or a signal indicating that the engine has been already started, the control unit 12A assumes that the subsequent operation is performed while the engine is in operation and sets the transmission intensity to the signal transmission intensity during engine operation which is a high transmission intensity in S316. In this case, the display unit 16A displays an indicator indicating that the engine starting has succeeded or the engine has been already started for the user.

On the other hand, when the received response signal is not a signal indicating that the engine starting has succeeded or a signal indicating that the engine has been already started, the control unit 12A determines that the engine is stopped in S318. Then, the control unit 12A assumes that the subsequent operation is performed while the engine is stopped and sets the transmission intensity to the signal transmission intensity during engine stop which is a low transmission intensity. In this case, the display unit 16A displays an indicator indicating that the engine starting has failed for the user.

When a response signal is not returned within the predetermined amount of time in S310, the control unit 12A sets the transmission intensity to a high transmission intensity in S316 so as to satisfactorily communicate at the time of subsequent transmission because the engine starting operation or the engine stopping operation is performed but the state of the vehicle 1A thereafter is not clear. In this case, the display unit 16A displays an indicator indicating that a response signal has not been returned from the vehicle 1A for the user. In any case, the storage unit 13A stores the transmission intensity set by the control unit 12A in S320.

When plural signal transmission intensities during engine operation (for example, the transmission intensity of the engine stopping signal and the transmission intensity while the engine and the air conditioner are in operation) are stored in the storage unit 13A and a response signal is not returned within a predetermined amount of time, the control unit 12A may set the transmission intensity to the largest transmission intensity (for example, the transmission intensity while the engine and the air conditioner are in operation) out of the plural signal transmission intensities during engine operation and may control the transmission unit 11A so as to transmit the signal with the largest transmission intensity. Accordingly, it is possible to guarantee the higher reliability of communication by setting the higher transmission intensity when it is not clear whether the engine starting operation and the engine stopping operation succeed.

Figure 8:
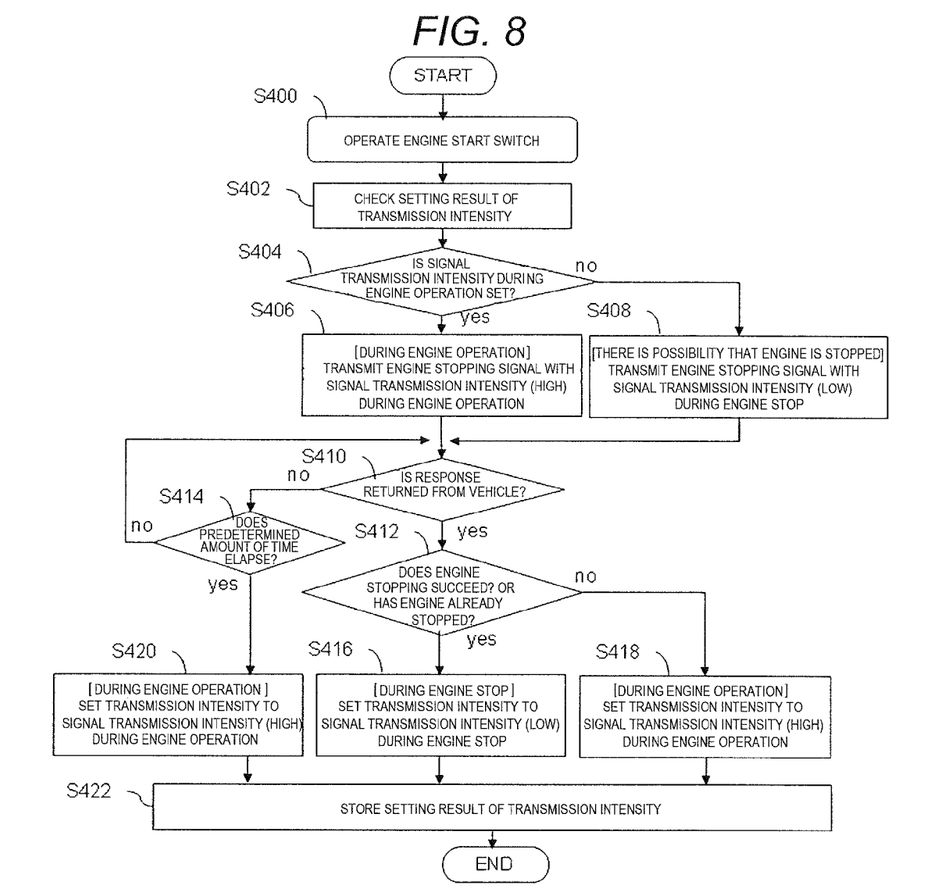
FIG. 8 is a flowchart illustrating control steps when an engine stop switch is operated in the portable device according to the second embodiment of the invention.

FIG. 8 illustrates control steps in the portable device 10A when the engine stop switch 152A is operated. The portable device 10A detects that the engine stop switch 152A is operated by the user in S400. Thereafter, the control unit 12A reads and checks the setting result of the transmission intensity stored in the storage unit 13A in order to transmit the engine stopping signal in S402. In S404, the control unit 12A checks whether the transmission intensity read from the storage unit 13A is the signal transmission intensity during engine operation which is a high transmission intensity. When the transmission intensity read from the storage unit 13A is the signal transmission intensity during engine operation, the control unit 12A controls the transmission unit 11A so as to transmit a signal with the high transmission intensity and the transmission unit 11A transmits the engine stopping signal with the high transmission intensity in S406.

On the other hand, when the transmission intensity read from the storage unit 13A is not the signal transmission intensity during engine operation which is a high transmission intensity, the control unit 12A controls the transmission unit 11A so as to transmit a signal with a low transmission intensity in S408 because there is a possibility that the engine is actually stopped, and the transmission unit 11A transmits the engine stopping signal with the low transmission intensity.

In step S410, the control unit 12A checks whether a response signal from the vehicle 1A is returned within a predetermined amount of time (S414) after the user transmits the engine starting permission signal or the engine stopping signal to the vehicle 1A. When a response signal is received from the vehicle 1A within the predetermined amount of time, the control unit 12A checks whether the received response signal is a signal indicating that the engine stopping has succeeded or a signal indicating that the engine has been already stopped in S412. When the received response signal is a signal indicating that the engine stopping has succeeded or a signal indicating that the engine has been already stopped, the control unit 12A assumes that the subsequent operation is performed while the engine is stopped and sets the transmission intensity to the signal transmission intensity during engine stop which is a low transmission intensity in S416. In this case, the display unit 16A displays an indicator indicating that the engine stopping has succeeded or the engine has been already stopped for the user.

On the other hand, when the received response signal is neither a signal indicating that the engine stopping has succeeded nor a signal indicating that the engine has been already stopped, the control unit 12A determines that the engine is in operation in S418. Then, the control unit 12A assumes that the subsequent operation is performed while the engine is in operation and sets the transmission intensity to the signal transmission intensity during engine operation which is a high transmission intensity. In this case, the display unit 16A displays an indicator indicating that the engine stopping has failed for the user.

When it is determined in S410 that a response signal is not returned within the predetermined amount of time, the control unit 12A sets the transmission intensity to the transmission intensity during engine operation which is a high transmission intensity in S420 so as to satisfactorily communicate at the time of subsequent transmission because the engine starting operation or the engine stopping operation is performed but the state of the vehicle 1A thereafter is not clear. In this case, the display unit 16A displays an indicator indicating that a response signal has not been returned from the vehicle 1A for the user. In any case, the storage unit 13A stores the transmission intensity set by the control unit 12A in S422.

Figure 9A:
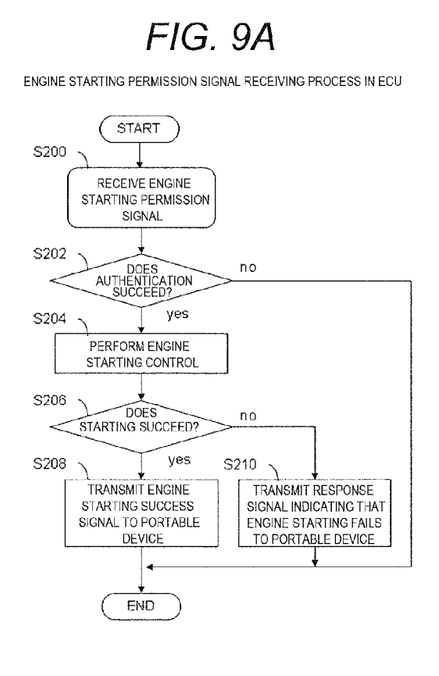
Figure 9B:
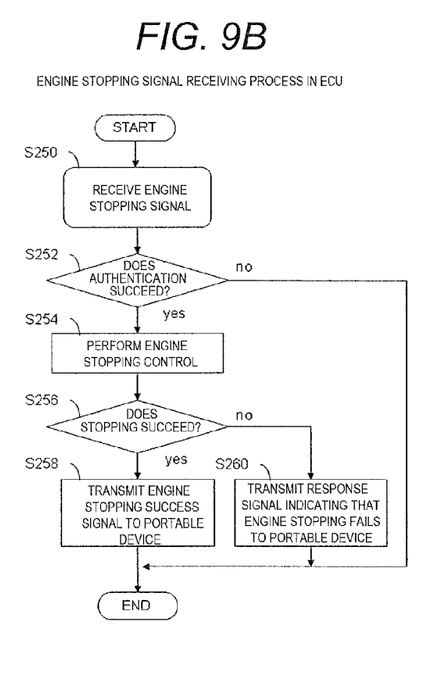

FIGS. 9A and 9B illustrate control steps when the engine starting permission signal and the engine stopping signal are received in the ECU of the vehicle 1A. In S200, the ECU receives the engine starting permission signal transmitted from the portable device 10A in S306 or S308. In S202, the ECU performs authentication whether the portable device 10A is a portable device qualified for the communication. When the authentication has succeeded, the ECU performs the control of starting the engine in S204 and checks whether the engine starting has succeeded in S206.

When the engine starting has succeeded, the ECU returns the engine starting success signal indicating that the engine starting has succeeded as a response signal to the portable device 10A in S208. When the engine starting success signal is received by the portable device 10A, the portable device 10A sets the transmission intensity to the signal transmission intensity during engine operation which is a high transmission intensity in S316 or S418. When the engine starting does not succeed, the ECU returns a signal indicating that the engine starting has failed as a response signal to the portable device 10A in S210. When the signal indicating that the engine starting has failed is received by the portable device 10A, the portable device 10A sets the transmission intensity to the signal transmission intensity during engine stop which is a low transmission intensity in S318 or S416. When the authentication does not succeed, no process is performed and the control flow ends.

In S250, the ECU receives the engine stopping signal transmitted from the portable device 10A in S406 or S408. In S252, the ECU performs authentication whether the portable device 10A is a portable device qualified for the communication. When the authentication has succeeded, the ECU performs the control of stopping the engine in S254 and checks whether the engine stopping has succeeded in S256.

When the engine stopping has succeeded, the ECU returns the engine stopping success signal indicating that the engine stopping has succeeded as a response signal to the portable device 10A in S258. When the engine stopping success signal is received by the portable device 10A, the portable device 10A sets the transmission intensity to the signal transmission intensity during engine stop which is a low transmission intensity in S318 or S416. When the engine stopping does not succeed, the ECU returns a signal indicating that the engine stopping has failed as a response signal to the portable device 10A in S260. When the signal indicating that the engine stopping has failed is received by the portable device 10A, the portable device 10A sets the transmission intensity to the signal transmission intensity during engine operation which is a high transmission intensity in S316 or S418.

As described above, by employing the configuration according to this embodiment, it is possible to guarantee the reliability of communication by transmitting a signal with a transmission intensity corresponding to the state of the vehicle 1A from the portable device 10A. Since it is not necessary to always transmit a signal with a high transmission intensity, it is possible to suppress the power consumption of the portable device 10A. A user can check whether the engine starting operation and the engine stopping operation succeed through the use of the portable device 10A. By setting the transmission intensity to a higher transmission intensity when it is not clear whether the engine starting operation and the engine stopping operation succeed, it is possible to guarantee the higher reliability of communication.

Third Embodiment

The aforementioned embodiments of the invention are applied to a vehicle equipped with an engine, but the invention is not limited to the embodiments. The invention can be applied to, for example, an electric automobile not equipped with an engine, because noise varies depending on whether an air conditioner, a car navigation device, a wiper, and the like are in operation. The transmission intensity with which a radio signal is transmitted from the portable device is changed depending on the state of the electric automobile, that is, the environment in which the noise level based on the state of the electric automobile is high or low.

When the power supply is turned off by acquiring the state of the electric automobile and an electric automobile start switch of the portable device is operated to transmit a signal, the portable device transmits the signal with the signal transmission intensity during electric automobile stop which is relatively low. On the other hand, when the power supply is turned on and an electric automobile stop switch of the portable device is operated to transmit a signal, the portable device transmits the signal with the signal transmission intensity during electric automobile operation which is relatively high.

That is, the portable device corresponding to an electric automobile includes a reception unit that receives state information of the electric automobile, a transmission unit that transmits a signal to the electric automobile, a control unit that controls communication with the electric automobile, and a storage unit that stores at least two signal transmission intensities of a signal transmission intensity during electric automobile stop and a signal transmission intensity during electric automobile operation higher than the signal transmission intensity during electric automobile stop, which can be set by the control unit. The control unit sets the transmission intensity of a signal to be transmitted from the transmission unit on the basis of the state information received by the reception unit and the signal transmission intensities stored in the storage unit, and the transmission unit transmits the signal on the basis of the transmission intensity set by the control unit. Here, the turning-on/off of the electric automobile means that electric power is supplied to a necessary ECU and the like in the vehicle. When it is mentioned that the turning-on/off of the power supply of the electric automobile is remotely controlled using the portable device, it means that an operation of operating an air conditioner, a lamp, or the like is performed before getting on the vehicle or an operation of stopping an air conditioner in operation is performed from the outside of the vehicle.

By transmitting a signal with a transmission intensity corresponding to a state of the electric automobile, a signal transmitted from the portable device can be received by the electric automobile side in spite of the influence of noise generated from the electric automobile and it is thus possible to guarantee the reliability of communication. For example, it is possible to prevent a situation in which a user powers off the electric automobile or the like but the powered-on state of the electric automobile or the like is maintained. Since it is not necessary to always transmit a signal with a high transmission intensity, it is possible to suppress the power consumption of the portable device.

The invention is not limited to the aforementioned embodiments, but can be put into practice by a configuration not departing from the gist of the appended claims. That is, while specific embodiments of the invention have been particularly illustrated and described, those skilled in the art can add various modifications in the numbers and other detailed configurations to the aforementioned embodiments without departing from the technical ideas and objects of the invention.

The invention claimed is:

1. A portable device comprising:
    a reception unit which receives state information from a vehicle, wherein the state information indicates operation of a device that affects a noise environment of the vehicle;
    a transmission unit which transmits a signal to the vehicle;
    a control unit which controls communication with the vehicle; and
    a storage unit which stores at least two signal transmission intensities comprising a signal transmission intensity during engine stop and a signal transmission intensity during engine operation higher than the signal transmission intensity during engine stop, the signal transmission intensities being able to be set by the control unit,
    wherein the control unit sets a signal transmission intensity of the signal transmitted from the transmission unit based on the state information received by the reception unit and the signal transmission intensities stored in the storage unit, and
    wherein the transmission unit transmits the signal based on the signal transmission intensity set by the control unit.

2. The portable device according to claim 1, further comprising:
    at least one switch,
    wherein the control unit controls the transmission unit so as to transmit the signal in response to detection of an operation of the switch.

3. The portable device according to claim 2,
    wherein the at least one switch comprises:
        an engine start switch for transmitting an engine starting permission signal; and
        an engine stop switch for transmitting an engine stopping signal.

4. The portable device according to claim 3,
    wherein the reception unit receives an engine starting success signal indicating that starting of an engine has succeeded in response to the engine starting permission signal and an engine stopping success signal indicting that stopping of the engine has succeeded in response to the engine stopping signal.

5. The portable device according to claim 4,
    wherein the control unit sets the signal transmission intensity to a highest signal transmission intensity of at least two signal transmission intensities during engine operation when the reception unit does not receive the engine starting success signal within a predetermined amount of time after the transmission unit transmits the engine starting permission signal or when the reception unit does not receive the engine stopping success signal within a predetermined amount of time after the transmission unit transmits the engine stopping signal.

6. A portable device comprising:
a reception unit which receives state information from a vehicle, wherein the state information indicates operation of a device that affects a noise environment of the vehicle;
a transmission unit which transmits a signal to the vehicle;
a control unit which controls communication with the vehicle; and
a storage unit which stores at least two signal transmission intensities comprising a signal transmission intensity during vehicle stop and a signal transmission intensity during vehicle operation higher than the signal transmission intensity during vehicle stop, the signal transmission intensities being able to be set by the control unit,
wherein the control unit sets a signal transmission intensity of the signal transmitted from the transmission unit based on the state information received by the reception unit and the signal transmission intensities stored in the storage unit, and
wherein the transmission unit transmits the signal based on the signal transmission intensity set by the control unit.

* * * * *